(12) United States Patent
Stolze et al.

(10) Patent No.: US 11,224,232 B2
(45) Date of Patent: Jan. 18, 2022

(54) CHOCOLATE MACHINE

(71) Applicant: Vorwerk & Co. Interholding GmbH, Wuppertal (DE)

(72) Inventors: Svenja Stolze, Schillingsfürst (DE); Christiane Stach, Radevormwald (DE); Stefan Kraut-Reinkober, Leverkusen (DE)

(73) Assignee: Vorwerk & Co. Interholding GmbH

( * ) Notice: Subject to any disclaimer, the term of this patent is extended or adjusted under 35 U.S.C. 154(b) by 215 days.

(21) Appl. No.: 16/189,671

(22) Filed: Nov. 13, 2018

(65) Prior Publication Data

US 2019/0142027 A1    May 16, 2019

(30) Foreign Application Priority Data

Nov. 16, 2017   (EP) .................................... 17202097

(51) Int. Cl.
| | |
|---|---|
| A47J 43/04 | (2006.01) |
| A23G 1/18 | (2006.01) |
| A23G 1/10 | (2006.01) |
| A47J 43/046 | (2006.01) |
| A23N 1/02 | (2006.01) |
| A47J 19/02 | (2006.01) |
| B01F 7/16 | (2006.01) |

(52) U.S. Cl.
CPC ................. *A23G 1/18* (2013.01); *A23G 1/10* (2013.01); *A23N 1/02* (2013.01); *A47J 19/027* (2013.01); *A47J 43/046* (2013.01); *B01F 7/162* (2013.01)

(58) Field of Classification Search
CPC ........ A47J 43/046; A47J 43/04; A47J 19/027; A23N 1/02

USPC .......................................... 99/510, 513, 348
See application file for complete search history.

(56) References Cited

U.S. PATENT DOCUMENTS

| | | | | |
|---|---|---|---|---|
| 4,339,992 A | * | 7/1982 | Kurland ................ | A47J 36/165 366/342 |
| 6,886,974 B1 | * | 5/2005 | Millan ................ | B01F 7/00141 366/191 |
| 8,707,862 B1 | * | 4/2014 | Oliver ................... | A47J 36/165 99/490 |
| 2006/0219100 A1 | * | 10/2006 | Gelfand ................ | A47J 27/004 99/348 |

(Continued)

FOREIGN PATENT DOCUMENTS

| | | |
|---|---|---|
| CN | 204670952 U | 9/2015 |
| CN | 205338565 U | 6/2016 |
| CN | 204600200 U | 9/2019 |

(Continued)

OTHER PUBLICATIONS

European Search Report for Application No. 17202097.6-1006, dated Apr. 5, 2018, 4 pages.

*Primary Examiner* — Reginald Alexander
(74) *Attorney, Agent, or Firm* — Barnes & Thornburg LLP

(57) ABSTRACT

The invention concerns a kitchen appliance comprising a stirring unit 5, 6 and a pot 2. An insert pot 3 is provided, which can be inserted in the pot 2 such that an interspace 4 remains between the pot 2 and the insert pot 3, wherein the stirring unit 5, 6 has a tool 5 for blending and/or chopping that is located in the interspace 4 when the insert pot 3 is inserted. The invention further comprises the use of the kitchen appliance for the preparation of chocolate and an insert system for a kitchen appliance.

15 Claims, 2 Drawing Sheets

(56) References Cited

U.S. PATENT DOCUMENTS

Figure 1:
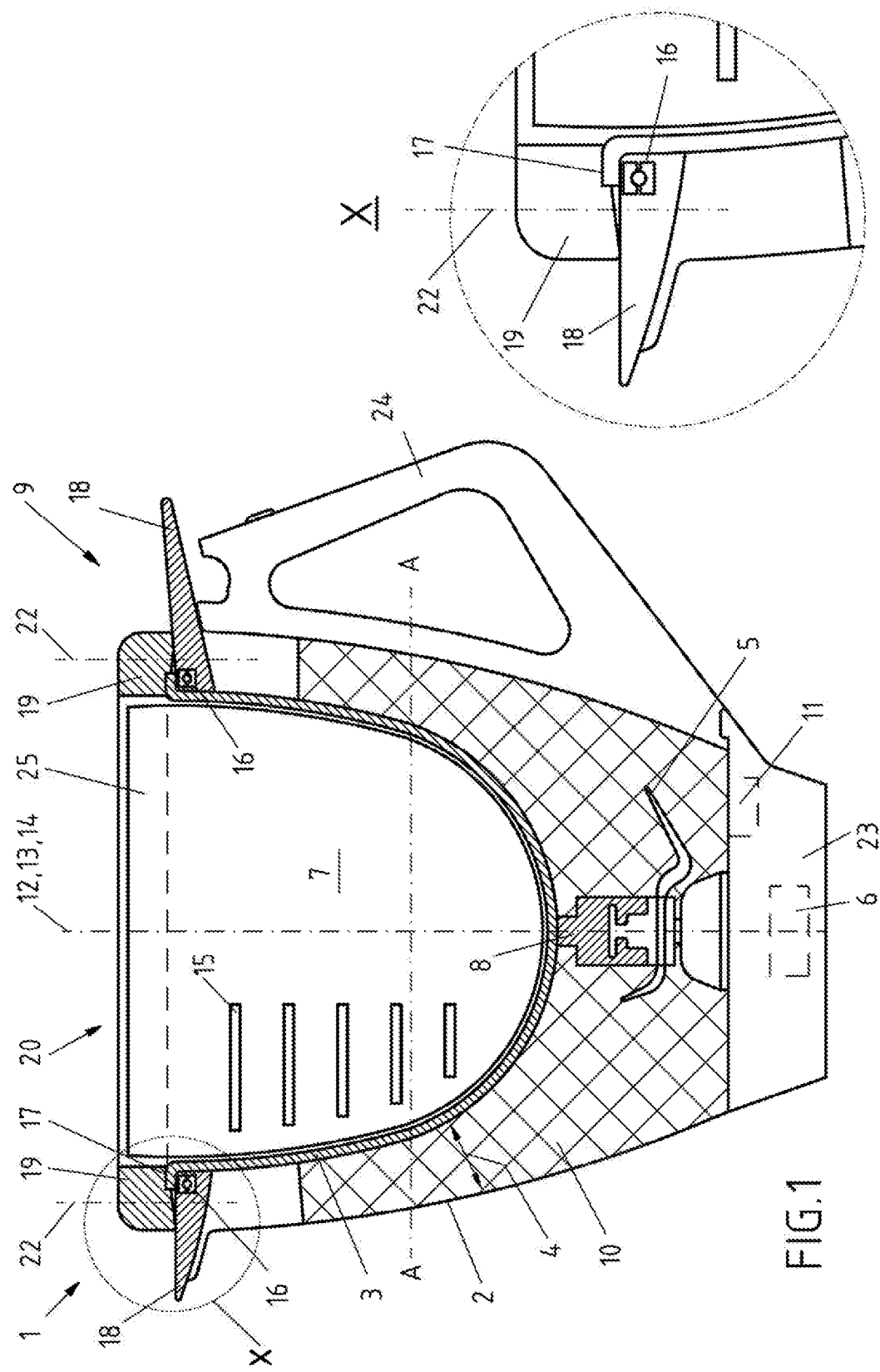

2006/0254429 A1* 11/2006 Sinton .................. A47J 36/165
 99/348

FOREIGN PATENT DOCUMENTS

| DE | 102014226327 | | 6/2015 | | |
|----|---|---|---|---|---|
| DE | 102014226327 | A1 | 6/2015 | | |
| DE | 102014226327 | A1 | 6/2016 | | |
| WO | 0213622 | A2 | 2/2002 | | |
| WO | WO-0213622 | A2 * | 2/2002 | ............... | A23G 9/12 |
| WO | 2016065454 | A1 | 10/2016 | | |

* cited by examiner

CHOCOLATE MACHINE

CROSS-REFERENCE TO RELATED APPLICATION

This application claims priority to and the benefit of European Patent Application No. 17202097.6, filed Nov. 16, 2017.

The invention concerns a kitchen appliance comprising a stirring unit and a pot, a use of the kitchen appliance and an insert system for a kitchen appliance.

For the preparation of chocolate, special machines are usually used, because chocolate can crystallize into different lattice structures depending on the tempering process during the preparation.

When preparing chocolate, the aim is to produce a high proportion of β-crystals and a possibly low proportion of crystals of other unstable forms, such as e.g. the form IV, in the molten chocolate by appropriately tempering the chocolate mass. Since the melting point of the β form is higher than that of the other modifications, it is generally sufficient to cool liquid chocolate to 34° C. and stir until sufficient crystal nuclei have formed in order to then let the entire chocolate mass to solidify in the β form by rapid cooling.

The object of the invention is to make it possible to producing high-quality chocolate even in a private household without having to purchase a special machine.

The problem is solved by a kitchen appliance according to the main claim as well as a use of a kitchen appliance and an insert system for a kitchen appliance according to the additional claims. Preferable embodiments result from the sub-claims.

For solving the problem, a kitchen appliance comprises a stirring unit and a pot. An insert pot is provided, which can be inserted in the pot such that an interspace remains between the pot and the insert pot. An inserted insert pot can be removed from the pot, thus is not permanently coupled to the pot. The stirring unit has a tool for blending and/or chopping. The tool is located in the interspace when the insert pot is inserted.

A kitchen appliance is an electrically powered apparatus for preparing food in private households. In particular, the kitchen appliance is designed in such a way that solid or liquid food products can be taken up in the pot and processed into a dish. Also the insert pot is designed such that solid or liquid food products can be taken up and processed into a dish. The insert pot is preferably designed to be liquid-tight downwards. "Downwards" means, in the case of intended use, in the direction of gravity. Alternatively, the insert pot may have an opening at the bottom, which, however, is sealed in a liquid-tight manner by an additional component during the production of chocolate. For example, a shaft can be guided through by the additional component in order to be able to move a scraper inside the additional pot. The interspace is watertight thanks to the pot and the insert pot as well as, if necessary, other components, specifically during an intended use in direction of gravity. "During use" means placing the kitchen appliance, including pot and therein inserted intermediate pot, on a substantially horizontal surface.

A stirring unit is generally a unit for blending and/or chopping of food by means of a tool which can be driven by an electric motor of the stirring unit. The transmission of a drive torque or a drive movement from the electric motor to the tool can preferably take place via a gear and/or by means of magnetic force.

In general, the tool in a kitchen appliance is the part of the stirring unit which is in direct contact with a food product in the pot and which can stir, blend or chop the food product.

A tool for blending and/or chopping, which is located in the interspace, means a part of the stirring unit within the interspace, which is arranged to allow moving a medium or heat carrier medium located within the interspace. The tool can thus be a separate component that is connected to the stirring unit. Alternatively or additionally, the tool can be a contour section of the stirring unit. If a medium or heat carrier medium like e.g. water is located within the interspace, the tool is in direct contact with the heat carrier medium and can move the heat carrier medium when the tool is driven by an electric motor.

For particularly effective movement of the medium or heat carrier medium, the tool has a rotationally non-symmetrical outer contour. The tool is preferably a mixing knife.

The tool is preferably rotary-symmetrical about its axis of rotation, i.e. it can be imaged on itself by rotation through specified angles. It can then rotate at low vibration and thus at high speed. Preferably, the tool comprises blades or knives protruding laterally from the axis of rotation, which can not only be used for stirring, but also for chopping.

Thanks to the tool for blending and/or chopping being located in the interspace, a flow in a heat carrier medium located in the interspace can be generated by the tool. A flow, which can be generated by the tool, can in turn produce a particularly homogeneous temperature distribution in the heat carrier medium by mixing colder and warmer portions of the heat carrier medium. This enables a particularly uniform heat induction into the chocolate mass via the insert pot, specifically for a particularly long period of time, so that a particularly high proportion of β-crystals can be achieved in the chocolate mass. Without the need to purchase a special machine, chocolate of particularly high quality can be prepared using an existing kitchen appliance.

In one embodiment, a heat carrier medium in the interspace can be heated by a heating element and/or be moved by the stirring unit. In particular, the heat carrier medium is low viscous or liquid. Preferably, the heat carrier medium is water. Since water is normally available in the kitchen quickly and inexpensively, the interspace can be filled with heat carrier medium with little effort.

A chocolate mass in the insert pot can be tempered particularly uniformly via the heat carrier medium in the interspace, wherein the heat carrier medium is heated preferably indirectly by the heating element. By moving the heat carrier medium using the stirring unit, a particularly homogeneous temperature distribution of the heat carrier medium can furthermore be achieved and it can be saved the need for an additional movement unit. Preferably, the heat carrier medium is moved by the tool of the stirring unit, which in turn is driven by the electric motor of the stirring unit.

Preferably, the heating element of the kitchen appliance can be used to heat the pot so that a chocolate mass can be melted by means of the heat carrier medium.

Preferably, a temperature sensor is included in the kitchen appliance, by which the temperature of the pot or the contents of the pot can be measured. In particular, the measured temperature is used to control the heating element in order to achieve and maintain an approximately constant target temperature of the content of the pot, for example of a dish or of the heat carrier medium. The melted chocolate mass can thus be kept at a certain temperature or tempered in a targeted manner.

In particular, there is a tempering device which can comprise at least one heating element, at least one temperature sensor and at least one control unit in order to achieve a desired temperature of the pot and to maintain it at least approximately constant. An input means can be provided to set a desired temperature. However, a program selected or configured by the user can also adjust or set the desired temperature.

Preferably, the heating element and/or the temperature sensor are integrated in a housing of the kitchen appliance. The heating element can be an inductive heating element. However, it can also use a heat transfer medium to heat the pot by means of heat conduction and thus also a content in the pot.

In one embodiment, a scraper is provided. The scraper may reach into the insert pot. Preferably, the kitchen appliance is arranged such that the scraper can be moved relative to the insert pot. The kitchen appliance can thus be arranged in such a way that a relative movement between the scraper and the insert pot can be carried out, in particular for preparing chocolate. In this way, a particularly homogeneous temperature distribution in the chocolate mass can be achieved, which favors the production of chocolate.

In one embodiment, the scraper can be heated to achieve a particularly homogeneous temperature distribution in the chocolate mass.

In one embodiment, the scraper or its outer contour is adapted to an inner contour of the insert pot such that the scraper scrapes along an inner side of the insert pot during operation, i.e. is in direct contact with the inner side of the insert pot or leastwise is separated from it by a small gap. By having the scraper scraping along the inner side of the insert pot during operation, excessive heating in the peripheral area can be avoided and a particularly high-quality chocolate be prepared.

In one embodiment, the scraper or its outer contour is adapted to an inner contour of the insert pot such that the scraper divides the insert pot in particular along a central axis into two equally sized halves and/or extends along a central axis, i.e. divides the insert pot into two equally sized halves in a plane through the central axis of the insert pot. In particular, the scraper divides the insert pot into two equally sized halves when viewed in cross-section (see FIG. 2).

By dividing the insert pot into two equally sized halves by the scraper, a particularly effective stirring of a melted chocolate mass is made possible. This further improves the production of chocolate.

Preferably, the scraper 7 separates one half from the other equally sized half by at least 50%, preferably 75%, particularly preferred 90% of the area in the plane along the central axis of the insert pot and/or at most 95%. In particular, the insert pot shall be divided by the scraper from the bottom of the insert pot to at least the center of the insert pot, to the top edge of the insert pot or beyond the top edge by the scraper. The top edge generally encloses the open top end of the insert pot. By said dividing or separating to the above described extend, it can be particularly effectively prevented liquefied chocolate mass from escaping the mixing by the scraper. The liquefied chocolate can thereby be forced to flow from one side of the scraper to the other side of the scraper through an opening in the scraper, which is provided for this purpose. This further improves the production of chocolate.

In one embodiment, the scraper comprises at least one flow-through opening. The flow-through opening connects the two equally sized halves of the insert pot, which are separated from each other by the scraper along the central axis of the insert pot. A liquefied chocolate mass can thus pass through the flow-through opening from one side of the scraper to the other side of the scraper. The formation of β-crystals can thereby be supported particularly effectively in order to be able to produce particularly high-quality chocolate.

Preferably, one or more preferably slit-shaped flow-through openings are provided, in particular at least two, preferably three, especially preferred four, and/or at most fifteen, preferably at most ten, especially at most eight. The formation of β-crystals can thereby be supported particularly effectively in order to be able to produce particularly high-quality chocolate.

Preferably, slit-shaped flow-through openings run horizontally and/or in an eccentric area to the central axis of the insert pot. This also allows supporting the formation of β-crystals particularly effectively in order to be able to produce particularly high-quality chocolate.

In one embodiment, the relative movement between the scraper and the insert pot is carried out by means of the stirring unit. Thus, the stirring unit drives the insert pot or the scraper. This saves the need for an additional drive. Preferably, an electric motor of the stirring unit drives the relative movement between the scraper and the insert pot. This saves the need for an additional motor to drive the relative movement. In particular, the electric motor is arranged to drive the tool. The electric motor thus has a double function.

In one embodiment, a cover for covering the interspace is provided, which is fixable in a rotationally fixed manner in relation to the pot and/or in a rotationally fixed manner to the pot.

Fixable means that fixing by the user is possible, as needed, without the use of an auxiliary tool and, at the same time, the fixation can be released without the use of an auxiliary tool. In particular, the cover can be fixed to the pot in a motionally fixed manner, preferably on the upper side of the pot. Preferably, a fixation is realized by means of a friction-locked and/or positive-locked connection, such as for example a screw connection, a latching connection and/or a snap fit connection.

Rotationally fixed in relation to the pot refers to a rotation about a longitudinal axis of the pot. A cover being fixed in a rotationally fixed manner in relation to the pot can also be fixed to another component, i.e. not or at least not only to the pot, as long as the cover is thereby rotationally fixed in relation to the pot to the pot.

By means of a cover for covering the interspace, which is fixable in a rotationally fixed manner in relation to the pot and/or in a rotationally fixed manner to the pot, the cover can be used to fix a further component like e.g. a scraper for the insert pot in a rotationally fixed manner in relation to the pot with particularly little additional effort.

By the covering the interspace with the cover, preferably from above, it is also enabled to prevent condensed heat carrier medium from reaching the chocolate mass inside the insert pot. The cover therefore has a double function.

However, it cannot be ruled out that the cover is rotatably mounted relative to the pot. The insert pot or scraper can then be connected to the cover in a rotationally fixed or motionally fixed manner so that the insert pot or scraper, respectively, can be rotatably mounted via the cover, specifically relative to the pot.

In one embodiment, the scraper is fixable in a rotationally fixed manner in relation to the pot. In a further embodiment, the scraper is fixable in a rotationally fixed manner to the pot or to the cover.

A scraper being rotationally fixed in relation to the pot enables relative movement to the insert pot by rotating the insert pot. This enables a particularly simple realization of driving the insert pot and thus to generate a relative movement by the stirring unit.

A scraper, which is fixable to the cover, can be handled particularly conveniently away from the kitchen appliance and independently of the comparatively voluminous pot, for example to fix the scraper to the cover, release it and clean it separately from the cover.

A scraper, which is fixable to the pot, can be fixed particularly reliably, especially if the pot is made of metal. In order to achieve good heat transfer, the insert pot is also preferably made entirely or mostly of metal.

Alternatively, instead of the scraper, the insert pot can be arranged to be fixed to the pot or the cover in a rotationally fixed manner. In this case, the scraper has be rotated relative to the fixed insert pot for mixing. This can be done, for example, by a magnetic scraper which is brought into rotation by a rotating magnet.

In one embodiment, a rotary-coupling device is provided which connects the tool to the insert pot in a rotationally fixed manner. The tool is thus connected to the insert pot in a rotationally fixed manner and, vice versa, the insert pot is also connected to the tool in a rotationally fixed manner. The rotational fixation to the tool, the electric motor or the stirring unit refers to an axis of rotation of the tool.

Thanks to the rotary-coupling device, which connects the tool with the insert pot in a rotationally fixed manner, the insert pot can be driven by the electric motor of the stirring unit without an additional drive. Furthermore, the kitchen appliance can thereby be used to prepare chocolate with very little effort.

Preferably, the rotary-coupling device can be or comprise a connecting element, which can be connected with one end to the tool and/or with the other end to the insert pot in a rotationally fixed manner by means of positive locking or permanently, i.e. non-detachably in a rotationally fixed manner. Preferably, the connecting element is permanently connected to the insert pot in order to achieve advantages in cleaning and handling.

Preferably, an arm of the rotary-coupling device or of one end of the connecting element reaches over a radial protrusion of the tool in order to realize a form-fit, rotationally fixed rotary coupling in a particularly reliable and simple way. In a simple embodiment, the arm extends in the connected state between two blades, knives or two mixing elements of the tool in order to create a load-bearing rotationally fixed connection in a technically simple way.

In particular, the tool can be replaced by the rotary-coupling device in order to achieve a particularly reliable rotary coupling to the insert pot.

By means of the stirring unit or the electric motor of the stirring unit, a torque or rotational movement of the tool can thereby be transmitted to the insert pot via the rotary coupling device. The insert pot is then rotated together with the tool. In this way, a tempered liquid heat carrier medium is mixed in the interspace and at the same time chocolate or chocolate ingredients are stirred in the insert pot in a technically simple way.

It can also be provided a rotary-coupling device which connects the tool with the scraper in a rotationally fixed manner. The rotary-coupling device then comprises in particular a magnet which is rotated by the stirring unit, the electric motor or the tool in order to transfer this rotation by magnetic force to the scraper with a magnet or to a magnetic scraper. In particular, the magnet is designed such that the magnet is fixable to the tool in a rotationally fixed manner. Alternatively, an exchange tool with one or more integrated magnets can be used.

The tool is connected preferably not detachably to the shaft in order to keep the number of parts to be handled low and thereby facilitate handling and also cleaning. The shaft with the tool attached thereto is preferably detachably connected to the electric motor in a rotationally fixed manner or can be connected to the electric motor in a rotationally fixed manner. The shaft can therefore be easily cleaned together with the tool to further improve thorough cleaning. The shaft is preferably connected to a liquid-tight sealing device, with which an opening in the bottom of the pot is or can be closed liquid-tight, in order to further facilitate handling and cleaning. The shaft is then guided through the bottom of the pot during use. However, the shaft can be detached from the pot in order to allow thoroughly cleaning.

In one embodiment, the cover has a bearing for rotatably mounting the insert pot. Rotatably mounting means that the insert pot can rotate relative to the cover when it is connected to the cover via the bearing. Because the cover has a bearing for rotatably mounting the insert pot, it can be made possible particularly easily that the insert pot is rotatably mounted to the pot and, at the same time, that the scraper is fixable to the pot in a rotationally fixed manner.

In one embodiment, a circumferential ledge of the insert pot rests on the bearing. This enables a particularly simple and reliable, movable mounting of the insert pot, which allows to be rotated about the central axis of the insert pot.

In particular, the ledge runs 360° around the central axis of the insert pot. Preferably, the ledge is arranged in an upper area or at the upper edge of the insert pot. Preferably, the ledge is produced by bending or forming the edge. In particular, the ledge protrudes substantially vertically from the outer side of the insert pot and/or forms an L-shape at the upper edge of the insert pot. A complex contour for connection to the bearing can thereby be avoided.

The bearing is in particular a ball bearing. Alternatively or additionally, a plain bearing can also be provided.

In one embodiment, the bearing extends annularly or with a ring-segment-shape around a longitudinal axis of the pot. A particularly large bearing surface of the insert pot or of the ledge of the insert pot on the bearing can thus be achieved. The insert pot can thus adhere to the bearing alone by means of gravity. Preferably, the bearing has on the top a non-slip coating or a non-slip covering for example of rubber, in order to prevent slippage between the insert pot and the bearing and thus uncontrolled movements.

In one embodiment, the cover comprises a base part for providing a bearing seat and/or for fixing to the pot, a connecting part for fixing the scraper and/or a lid for closing a cover opening. The bearing seat serves in particular to receive the bearing. The cover opening allows the user to place ingredients in the insert pot from above. The lid for closing the cover opening enables to allow regulating the temperature in the replacement pot particularly precisely also over a longer period of time.

By providing the base part and the connecting part, it is made possible that the insert pot, the cover and the scraper can be fixed and detached together by the user so that each of the components can be cleaned with particular care.

In addition, different variants of the insert pot and/or the scraper can be used to prepare several types or quantities of chocolate, and at least some of the components can also be reused to prepare other dishes. This allows a particularly high flexibility without additional parts.

In one technically particularly simple embodiment, it is also possible that the insert pot can be mounted on the shaft, to which the tool is attached, so that a circumferential ledge of the insert pot only reaches into a circumferential groove in the cover. Also with this embodiment, the cover can advantageously include an opening that provides access to the insert pot. Ingredients can then be added to the insert pot via the opening.

In one embodiment, the insert pot, the pot and/or the tool are arranged coaxially to each other. A particularly compact arrangement is thus made possible.

Preferably, the insert pot is designed to be rotationally symmetrical, preferably substantially as a whole being rotationally symmetrical, or being rotationally symmetrical in a central area and/or a bottom area. A particularly uniform rotary movement and flow of the heat carrier medium can thus be enabled.

The pot preferably has a handle and is therefore usually not rotationally symmetrical. However, areas of the pot, in particular areas at the bottom of the pot, can be rotationally symmetrical or at least rotary-symmetrical.

A further aspect of the invention concerns the use of the kitchen appliance described above for the preparation of chocolate. A chocolate of particularly high quality can be prepared in this way without having to procure an additional special machine.

A further aspect of the invention concerns a method for preparing chocolate, wherein a kitchen appliance, in particular the kitchen appliance described above, is provided with a stirring unit and a pot as well as an insert pot, wherein the insert pot is inserted into the pot and the interspace between the pot and the insert pot, in which in particular a tool for blending and/or chopping of the stirring unit is located, is filled with a heat carrier medium.

The above-mentioned features and embodiments of the kitchen appliance form the embodiments of this method. A particularly high-quality chocolate can thereby be produced.

A further aspect of the invention concerns an insert system for the kitchen appliance, which has a stirring unit and a pot, particularly of the aspect of the invention described at the beginning, wherein the insert system comprises an insert pot, a scraper and/or a cover. The above-mentioned features and embodiments of the preceding aspects of the invention form the embodiments of this aspect of the invention.

The insert system makes it possible to prepare chocolate with an existing kitchen appliance. There is no need to purchase an additional special machine for the production of chocolate.

A further aspect of the invention to solve the initially raised problem concerns a kitchen appliance with a stirring unit and a pot, wherein an insert pot is provided which can be inserted into the pot such that an interspace remains between the pot and the insert pot. With such a kitchen appliance, a particularly high-quality chocolate can be produced. The above features and embodiments of the preceding aspects of the invention form the embodiments of this aspect of the invention.

In the following, embodiment examples of the invention are explained in more detail based on figures. Features of the embodiment examples and of further alternative or additional embodiments described below can be combined alone or in a plurality with the claimed objects. The claimed scopes of protection are not limited to the embodiment examples.

It is shown:

FIG. 1: Schematic sectional view of a kitchen appliance from the side FIG. 2: Schematic sectional view of the kitchen appliance from top.

FIG. 1 illustrates a kitchen appliance 1 with a stirring unit 5, 6 and a pot 2, which can be closed on the underneath by a housing 23. A handle 24 is laterally attached to the pot 2. The kitchen appliance 1 is designed for preparing a dish. For example, a food product is put into the pot 2 and crushed by the tool 5 of the stirring unit 5, 6, which is in particular provided as a mixing knife. By means of the heating element 11, the food product can be cooked in the pot 2 to prepare a dish.

For the preparation of chocolate with this kitchen appliance 1, an insert system is used comprising an insert pot 3, a scraper 7 and a cover 9.

The cover 9 is substantially composed of a base part 18, a connecting part 19 and a lid. The cover 9 has a cover opening 20 which extends through an access opening of the connecting part 19 and an opening of the base part 18 that is formed coaxially with the central axis 13 of the insert pot 3.

The cover 9 rests with the base part 18 on the pot 2, i.e. with the lower surface of the base part 18. The base part 18 can be fixed to the pot 2 in a manner being rotationally fixed around the longitudinal axis 12 of the pot 2, for example by means of a non-slip surface or a clamping or locking mechanism that are not shown. In one embodiment, one or two opposite lateral locking elements (not visible in the sectional drawings of FIGS. 1 and 2) of the kitchen appliance can press the cover 9 or the base part 18 of the cover 9 onto the pot 2 in order to enable a fixation that is rotationally fixed, in particular automatically or motorized.

A bearing 16 is arranged on the upper side of the base part 18, in particular in form of a ball bearing. The bearing 16 can also be a plain bearing. The bearing 16 extends in particular around the opening of the base part 18, adjoins said opening and/or is flush with an inner wall of said opening.

The opening of the base part 18 is adapted to the insert pot 3 such that the insert pot 3 can be passed from above through the opening of the base part 18, with the bottom of the insert pot 3 ahead, until a circumferential radial ledge 17 rests on the bearing 16 from above. The insert pot 3, which is connected in this way to the base part 18, can thus be rotatably mounted to the cover 9. If the cover 9 is fixed to pot 2 as described above in a rotationally fixed manner, the insert pot 3 can be rotated relative to the pot 2. Since the opening of the base part 18 is preferably oriented coaxially to the center axis 13 of the insert pot 3, the insert pot 3 can be rotated coaxially to the longitudinal axis 12 of the pot 2.

The opening of the base part 18 preferably has a smaller diameter than the pot 2 or the top edge of the pot 2. An interspace 4 can thus be present between the insert pot 3 and the pot 2. The interspace can be maintained in a defined manner by the base part 18. At the same time, the base part 18 covers the interspace 4 and thus avoids contamination of the heat carrier medium 10 within the interspace 4.

In one embodiment, the base part 18 has a flap to fill the heat carrier medium 10 into the interspace 4 without having to remove the cover 9 from the pot 2. In an alternative or additional embodiment, the heat carrier medium 10 is first of all filled into the pot 2 and then the cover 9, together with the insert pot 3 connected to it, is inserted into the pot 2.

After the insert pot 3 has been connected to the base part 18 as described above, the connection part 19 is attached to the base part 18 from above. Preferably, said attaching is carried out using at least one screw connection 22, which is arranged such that the screw connection can be tightened and untighten with one hand. Alternatively, a clamping or snapping mechanism can be used.

By means of the connection part 19, the insert pot 3 can thus be received in the cover 9 in a manner being secured against detaching. For that purpose, the connection part 19 is in particular arranged above the ledge 17 of insert pot 3 and thus blocks the insert pot 3 from moving upwards out of the base part 18. Preferably, in a ready-to-operate state, an air gap is provided between the ledge 17 of the insert pot 3 and an underside of the connection part 19. This prevents the insert pot 3 from being clamped. In addition, during operation, the insert pot 3 is pressed down onto the bearing 16 by its own weight and the filling weight, so that the insert pot 3 rests reliably and without slippage on bearing 16 during operation.

The connection part 19 has a double function. Because in addition to securing the insert pot 3, the connection part 19 also serves to fix the scraper 7 in a motionally fixed manner, in particular by means of a recess 25 and fastening means of the connection part 19.

The scraper 7 is therefore attached and fixed to the connection part 19, before the connection part 19 is attached to the base part 18. In particular, the recess 25 is provided on the underside of the connection part 19, which faces the insert pot 3 in the ready-to-operate state of the insert system. Preferably, the recess 25 is a through-opening so that the scraper 7 can be inserted into the recess 25 from below or above. Preferably, the recess 25 is a slot, which is adapted to the outer contour of the scraper 7 or the upper end area of the scraper 7 such that the scraper 7 can be inserted into the slot in a tightly fitting manner. Fastening means like for example a manually operable screw connection or a clamping mechanism serve to fix the scraper 7 in the desired position within the recess 25. In particular, the fastening means is arranged such that the position of the scraper 7 can be flexibly adjusted and fixed relative to the connecting part 19 and thus relative to the bottom of the insert pot 3. Tolerances and wear of the scraper 7 can thus be compensated and a targeted adjustment of a gap between the scraper 7 and the insert pot 3 can be carried out.

The cover also includes a lid, which is not shown, for closing the access opening of the connection part 19. The access opening is used for supplying ingredients into the insert pot 3 and is not visible in the sectional views of FIGS. 1 and 2.

Prior to the insertion of the interconnected insert system, the rotary-coupling device 8 in form of a connecting element is connected to the tool 5 in a rotationally fixed manner. In particular, the rotary-coupling device 8 is a two-piece, with both parts enclosing a part of the tool 5 or the stirring unit within the pot 2. Both parts are locked in the enclosed state. Alternatively or additionally, there is a cavity in the rotary-coupling device 8 for mounting on an upper end of the tool 5 or the stirring unit within the pot 2. Preferably, an arm of the rotary-coupling device 8 is provided that abuts against a radial protrusion of the tool 5 to achieve a positive-locking connection in a direction of rotation. A rotary coupling between the tool 5, which is rotatable about the rotation axis 14, and the rotary-coupling device 8 can be realized either by clamping force of the both parts and/or by positive locking.

In one embodiment, an axial cavity or an axial protrusion with a non-rotationally symmetrical contour is provided (not shown) at the upper side of the rotary-coupling device 8, i.e. on the end opposite to the tool 5. In one further embodiment, the insert pot can be placed in the cavity or over the protrusion with a correspondingly shaped counter contour (not shown), which is capable of creating a rotationally fixed connection to the rotary-coupling device 8. Thereby, coupling of the insert pot 3 to the tool 5 in a rotationally fixed manner can be carried out in a "blind" way, i.e. without the user being able to see the opposite contour on the bottom side of the insert pot 3 and the connecting element. This is, because these components are hidden by the insert pot 3 and/or the cover 9. Intuitive insertion and connection can thus be made possible. The rotary-coupling device 8 enables that the insert pot 3 is rotated by the electric motor 6 of the rotating device 5, 6.

Figure 2:
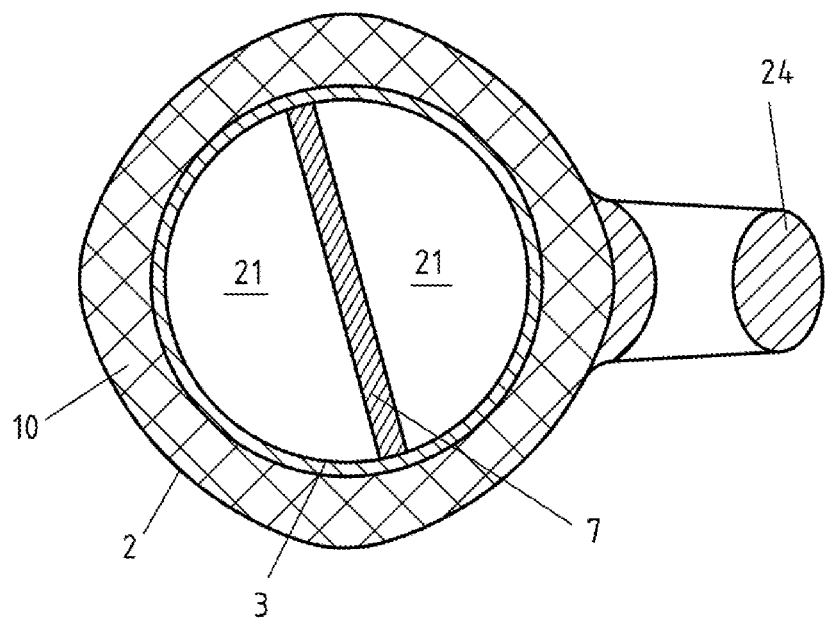

FIG. 2 shows from above a sectional view in the sectional plane, which is illustrated in FIG. 1. The scraper 7 divides the insert pot 3 into two equally sized halves. Circumferential arrows illustrate that the insert pot 3 rotates around the scraper 7, which is rotationally fixed to the pot 2.

The preparation of chocolate with the kitchen appliance 1 is carried out in one embodiment as described below.

A heat carrier medium 10, in particular water, is added to the pot 2. The rotary-coupling device 8 is connected to the tool 5 or to a part of the stirring unit 5, 6 inside the pot 2. The cover 9 with the insert pot 3 connected to it and with the scraper 7 are inserted into the pot 2 in such a way that the insert pot 3 is connected to the rotary-coupling device 8 in a rotationally fixed manner. Cocoa butter and other ingredients are fed into the insert pot 3 via the cover opening 20 and the lid is then closed. A program for preparing chocolate is selected via a user interface of kitchen appliance 1. By means of the heating element 11, the heat carrier medium 10 is heated and via this also the chocolate mass 21, which is blanked out in FIG. 1, and the temperature is regulated in particular by means of a temperature sensor which is not shown. The electric motor 6 rotates the insert pot 3. The scraper 7 is fixed relative to the pot 2 via the cover 9. By means of the relative movement, which is thus produced between the scraper 7 and the insert pot 3, the liquefied chocolate mass 21 is blended. The scraper 7 divides the insert pot 3 into two equally sized halves, wherein the chocolate mass 21 can only pass from one half to the other half through several slit-shaped flow-through openings 15. The rotating tool 5 not only drives the insert pot 3 but at the same time generates a flow in the heat carrier medium 10, which is located in the interspace 4 between the pot 2 and the insert pot 3. In this way, the heat carrier medium has a homogeneous temperature distribution.

The tempering and blending of the chocolate mass 21 at approximately 34° C. can be carried out such that a high proportion of β-crystals is formed in the chocolate mass 21 and only a particularly low proportion of crystals of other more unstable forms such as, for example, Form IV. Finally, the liquid chocolate mass 21 of 34° C. is abruptly cooled, in particular by removing the insert pot 3 and immersing it in a preferably ice-cold water bath, so that the chocolate mass solidifies in the β-form.

A high-quality chocolate can thus be prepared by the kitchen appliance.

In another embodiment, the rotary-coupling device 8 is permanently connected to the insert pot 3 in order to keep the number of parts to be handled low. The insert pot 3 is then inserted into the pot 2 together with the rotary-coupling device 8 in such a way that the rotary-coupling device 8 is connected to a part of the stirring unit 5, 6 inside pot 2 in a rotationally fixed manner. Besides, chocolate is produced in the manner as described above.

The invention claimed is:

1. A kitchen appliance comprising:
   a stirring unit having a tool for blending and/or chopping;
   a pot configured to selectively receive an insert pot to define an interspace between the pot and the insert pot, wherein the tool is disposed within the interspace when the insert pot is disposed within the pot; and
   a scraper, wherein the insert pot is configured to selectively receive the scraper therewithin,
   wherein the scraper and the insert pot are configured for relative motion with respect to one another,
   wherein the scraper is a flat wall adapted to an inner contour of the insert pot such that the scraper extends along a central axis of the insert pot and divides the insert pot into two equally sized portions,
   wherein the scraper is bisected into a first half and a second half by a central vertical axis, and
   wherein only one of the first half and the second half defines at least one flow-through opening.

2. The kitchen appliance of claim 1, wherein a heat carrier medium in the interspace can be heated by a heating element, in particular by a tempering device, and/or be moved by the stirring unit.

3. The kitchen appliance of claim 1, wherein the scraper is adapted to the inner contour of the insert pot such that the scraper scrapes along an inner side of the insert pot during operation.

4. The kitchen appliance of claim 1, wherein the relative movement between the scraper and the insert pot is carried out by means of the stirring unit.

5. The kitchen appliance of claim 1, wherein a cover for covering the interspace is provided, which is fixable in a rotationally fixed manner in relation to the pot.

6. The kitchen appliance of claim 5, wherein the scraper is fixable in a rotationally fixed manner in relation to the pot or to the cover.

7. The kitchen appliance of claim 1, wherein a rotary-coupling device is provided which connects the tool to the insert pot in a rotationally fixed manner.

8. The kitchen appliance of claim 5, wherein the cover has a bearing for rotatably mounting the insert pot.

9. The kitchen appliance of claim 8, wherein a circumferential ledge of the insert pot rests on the bearing and/or the bearing extends annularly or with a ring-segment-shape around a longitudinal axis of the pot.

10. The kitchen appliance of claim 1, wherein the cover comprises a base part for providing at least one of a bearing seat and/or for fixing to the pot, a connecting part for fixing the scraper, and a lid for closing a cover opening.

11. The kitchen appliance of claim 1, wherein the at least one flow-through opening is slit-shaped.

12. The kitchen appliance of claim 11, wherein a width of the at least one flow-through opening taken along a direction perpendicular to a longitudinal direction of the at least flow-through opening is less than one half of a height of the scraper.

13. An insert system for a kitchen appliance, the insert system comprising:
    an insert pot;
    a scraper; and
    a cover,
    wherein the kitchen appliance is configured for relative motion between the scraper and the insert pot,
    wherein the scraper is a flat wall adapted to an inner contour of the insert pot such that the scraper extends along a central axis and divides the insert pot into two equally sized halves, and
    wherein the scraper is bisected into a first half and a second half by a central vertical axis, and
    wherein only one of the first half and the second half defines at least one flow-through opening.

14. The insert system of claim 13, wherein the scraper is shaped to match the inner contour of the insert pot such that the scraper scrapes along an inner side of the insert pot during operation.

15. The system of claim 14, wherein relative movement between the scraper and the insert pot is driven by means of a powered stirring unit included in the system.

* * * * *